United States Patent
Khandelwal et al.

(10) Patent No.: US 11,080,526 B2
(45) Date of Patent: Aug. 3, 2021

(54) SATELLITE IMAGE CLASSIFICATION ACROSS MULTIPLE RESOLUTIONS AND TIME USING ORDERING CONSTRAINT AMONG INSTANCES

(71) Applicant: Regents of the University of Minnesota, Minneapolis, MN (US)

(72) Inventors: Ankush Khandelwal, Minneapolis, MN (US); Anuj Karpatne, Minneapolis, MN (US); Vipin Kumar, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 150 days.

(21) Appl. No.: 16/103,523

(22) Filed: Aug. 14, 2018

(65) Prior Publication Data
US 2019/0057245 A1 Feb. 21, 2019

Related U.S. Application Data

(60) Provisional application No. 62/545,777, filed on Aug. 15, 2017.

(51) Int. Cl.
*G06K 9/00* (2006.01)
*G06T 7/55* (2017.01)
*G06K 9/62* (2006.01)
*G06T 7/11* (2017.01)

(52) U.S. Cl.
CPC ....... *G06K 9/0063* (2013.01); *G06K 9/00651* (2013.01); *G06K 9/6202* (2013.01); *G06K 9/6267* (2013.01); *G06T 7/11* (2017.01); *G06T 7/55* (2017.01); *G06K 9/6255* (2013.01); *G06T 2207/10032* (2013.01); *G06T 2207/30188* (2013.01)

(58) Field of Classification Search
None
See application file for complete search history.

(56) References Cited

U.S. PATENT DOCUMENTS

| | | | | |
|---|---|---|---|---|
| 9,619,734 B2* | 4/2017 | Marchisio | ............ | G06K 9/4642 |
| 10,025,983 B2* | 7/2018 | Guan | .................. | G06K 9/0063 |
| 10,026,315 B2* | 7/2018 | High | ................. | G06Q 10/0631 |
| 10,217,236 B2* | 2/2019 | Kraft | .................... | G06K 9/4609 |
| 10,664,750 B2* | 5/2020 | Greene | .................... | G06N 3/02 |

(Continued)

OTHER PUBLICATIONS

Vojinovic et al 2013. "A Machine Learning Approach for Estimation of Shallow Water Depths from Optical Satellite Images and Sonar Measurements." Journal of Hydroinformatics 15 (4): 1408-1424. (Year: 2013).*

(Continued)

*Primary Examiner* — Andrae S Allison
(74) *Attorney, Agent, or Firm* — Theodore M. Magee; Westman, Champlin & Koehler, P.A.

(57) ABSTRACT

A method includes classifying low-resolution pixels of a low-resolution satellite image of a geographic area to form an initial classification map and selecting at least one physically-consistent classification map of the low-resolution pixels based on the initial classification map. A water level associated with at least one of the physically-consistent classification maps is then used to identify a set of high-resolution pixels representing a perimeter of water in the geographic area.

20 Claims, 9 Drawing Sheets

(56) References Cited

U.S. PATENT DOCUMENTS

2012/0070071 A1* 3/2012 Rankin ............... G06K 9/00805
   382/154
2013/0110399 A1* 5/2013 Moss ...................... G01W 1/10
   702/3

OTHER PUBLICATIONS

Liu et al, Automated extraction of coastline from satellite imagery by integrating Canny edge detection and locally adaptive thresholding methods, Int. J. Remote Sensing, Mar. 10, 2004, vol. 25, No. 5, 937-958 (Year: 2004).*
K. Tseng, C. K. Shum, J. Kim, X. Wang, K. Zhu and X. Cheng, "Integrating Landsat Imageries and Digital Elevation Models to Infer Water Level Change in Hoover Dam," in IEEE Journal of Selected Topics in Applied Earth Observations and Remote Sensing, vol. 9, No. 4, pp. 1696-1709, Apr. 2016, (Year: 2016).*
Aerts et al., Evaluating flood resilience strategies for coastal megacities, Science, vol. 344, No. 6183, pp. 473-475, 2014.
Amoros-Lopez et al., Multitemporal fusion of Landsat/TM and ENVISAT/Meris for corp monitoring, International Journal of Applied Earth Observation and Geoinformation, vol. 23, pp. 132-141, 2013.
Carroll et al., Shrinking lakes of the Arctic: Spatial relationships and trajectory of change, Geophysical Research Letters, vol. 38, L20406, 5 pages, 2011.
Foley et al., Global consequences of land use, Science, vol. 309, pp. 570-574, 2005.
Gao et al., On the blending of the Landsat and MODIS surface reflectance: Predicting daily Landsat surface reflectance, IEEE Transations on Geoscience and Remote Sensing, vol. 44, No. 8, pp. 2207-2218, 2006.
Hall et al., Coping with the curse of freshwater variability, Science, vol. 346, No. 6208, pp. 429-430, 2014.
Hilker et al., Generation of dense time series synthetic data through data blending with MODIS using a spatial and temporal adaptive reflectance fusion model, Remote Sensing of Environment, vol. 113, pp. 1988-1999, 2009.
Khandelwal et al., Post classification label refinement using implicit ordering constraint among data instances, IEEE International Conference on Data Mining, pp. 799-804, 2015.
Khandelwal et al., An approach for global monitoring of surface water extent variations using MODIS data, Remote Sensing of Environment, 44 pages, 2016.
Konikow, Contribution of global groundwater depletion since 1900 to sea-level rise, Geophysical Research Letters, vol. 38, L17401, 5 pages, 2011.
Liu et al., Using local transition probability models in Markov random fields for forest change detection, Remote Sensing of Environment, vol. 112, pp. 2222-2231, 2008.
Webpage, Land processes distributed active archive center, http://lpdaac.usgs.gov, 1 page, 2018.
McNeil, Southern ocean acidificatdion: A tipping point at 450-ppm atmospheric CO2, Proceedings of the National Academy of Sciences, vol. 105, No. 48, pp. 18860-18864, 2008.
Pekel et al., High-resolution mapping of global surface water and its long-term changes, Nature, vol. 540, No. 7633, pp. 418-422, 2016.
Seneviratne, Historical drought trends revisited, Nature, vol. 491, No. 7424, pp. 338-339, 2012.
Wada et al., Global depletion of groundwater resources, Geophysical Research Letters, vol. 37, L20402, 5 pages, 2010.
Zhu et al., An enhanced spatial and temporal adaptive reflectance fusion model for complex heterogeneous regions, Remote Sensing of Environment, vol. 114, pp. 2610-2623, 2010.
Zhu et al., A flexible spatiotemporal method for fusing satellite images with different resolutions, Remote Sensing of Environment, vol. 172, pp. 165-177, 2016.
Zurita-Milla et al., IEEE Geoscience and Remote Sensing Letters, vol. 5, No. 3, pp. 453-457, 2008.

\* cited by examiner

SATELLITE IMAGE CLASSIFICATION ACROSS MULTIPLE RESOLUTIONS AND TIME USING ORDERING CONSTRAINT AMONG INSTANCES

CROSS-REFERENCE TO RELATED APPLICATION

The present application is based on and claims the benefit of U.S. provisional patent application Ser. No. 62/545,777, filed Aug. 15, 2017, the content of which is hereby incorporated by reference in its entirety.

This invention was made with government support under IIS1029711 awarded by the National Science Foundation. The government has certain rights in the invention.

BACKGROUND

Remote sensing satellites capture images of different geographic areas. The resolution of such images and the time periods between when successive images of the same geographic area are captured vary from satellite to satellite. After an image is captured, the contents of the image must be analyzed to determine what is contained in the image. In some systems, classifiers are used to classify each pixel as containing a particular type of land cover such as water or land. Together, these pixel classifications provide a classification map that describes the land cover classification of each geographic sub-area within a geographic area. Because of the large number of images and the large number of pixels in each image, classifying each captured image cannot be done by hand and computerized classifiers must be used.

The discussion above is merely provided for general background information and is not intended to be used as an aid in determining the scope of the claimed subject matter. The claimed subject matter is not limited to implementations that solve any or all disadvantages noted in the background.

SUMMARY

A method includes receiving a satellite image of an area and classifying each pixel in the satellite image as representing water, land or unknown using a model. For each of a plurality of possible water levels, a cost associated with the water level is determined, wherein determining the cost associated with a water level includes determining a number of pixels for which the model classification must change to be consistent with the water level and determining a difference between the water level and a water level determined for the area at a previous time point. The lowest cost water level is selected and used to reclassify at least one pixel.

In accordance with a further embodiment, a method includes classifying low-resolution pixels of a low-resolution satellite image of a geographic area to form an initial classification map and selecting at least one physically-consistent classification map of the low-resolution pixels based on the initial classification map. A water level associated with at least one of the physically-consistent classification maps is then used to identify a set of high-resolution pixels representing a perimeter of water in the geographic area.

In accordance with a still further embodiment, a system includes a classifier receiving a low-resolution image of a geographic area and classifying each pixel of the image to form an initial classification map and a comparison module comparing the initial classification map to a plurality of physically-consistent classification maps to select a physically-consistent classification map. A high-resolution classifier classifies high-resolution pixels of the geographic area based on the selected physically-consistent classifier map.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6($b$) is a graph of initial water level classifications over time.

FIG. 6($c$) shows graphs of total cost, mismatch cost, and transition costs as a function of a.

FIGS. 6($d$)-6($h$) show graphs of corrected classifications over time using different values of $\alpha$.

FIG. 8($b$) shows a high-resolution water extent map obtained from our method.

DETAILED DESCRIPTION OF ILLUSTRATIVE EMBODIMENTS

Accuracy of pixel classifications is limited due to various factors such as noise and outliers, large amounts of missing data (due to clouds and sensor failures), lack of representative training data, and appropriate classification models that can handle the high spatial and temporal heterogeneity at a global scale. Moreover, due to resource constraints and physical limitations in sensor design, a single dataset does not provide desired spatial and temporal resolution to create surface extent products required by various applications. For example, the ETM+ sensor on-board the LANDSAT 7 satellite captures earth observation data at 30 m spatial resolution every 16 days. On the other hand, the MODIS sensor on-board Terra and Aqua satellites captures data at much coarser spatial detail (500 m) but every day. The multi-source nature of this data poses challenges in extracting information at the desired level of spatial detail and temporal frequency. Some prior methods rely on learning a mapping between low-resolution data and high-resolution data at time-steps when both datasets are available and use this mapping in time-steps when only low-resolution data is available. This constraint of overlapping time-steps has two key limitations. First, in most real situations, a single snapshot in time can have a large amount of noise and missing data and hence might not have enough information to learn robust mapping between two resolutions. Second, it limits the information transfer process to only the duration where both datasets are available.

In the various embodiments, we present a new methodology that uses robust physical principles governing surface water dynamics to overcome the challenges in transferring information across complementary datasets. Specifically, the embodiments provide two new methods that exploit relative ordering among instances (due to elevation structure) to effectively transfer information between multiple sources.

Figure 1:
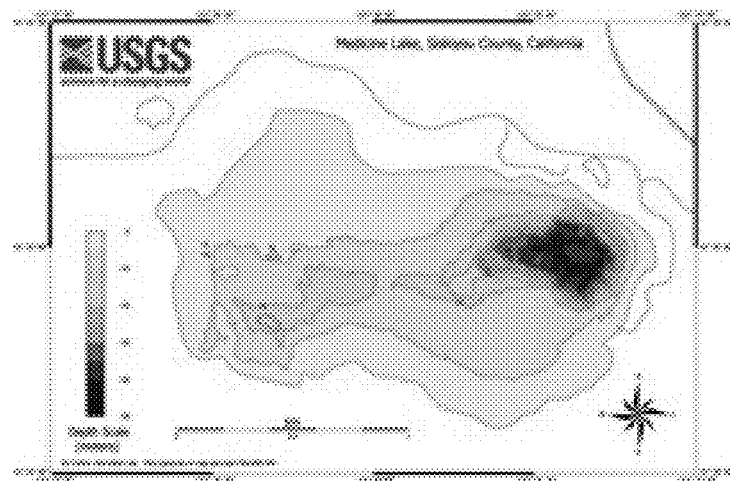
FIG. 1 is a bathymetric map of Medicine Lake in California.

In the various embodiments, the elevation structure (bathymetry) of a water body is used to provide a very robust physical constraint that improves the accuracy of the classification maps. Elevation of a geographical location on earth is its height above a certain fixed point (e.g. elevation above sea level). Earth's surface is highly uneven and has various bowl shaped depressions called basins. Water bodies are formed when water fills these basins. Hence, locations inside and around the water have varying elevation/depth. For example, FIG. 1 shows this depth information (called bathymetry) of Medicine Lake in California using contour lines to represent locations that are at the same elevation. This elevation information of locations introduces an inherent ordering in the locations. This ordering constraint determines how a water body grows or shrinks. The key idea is the following:

if a location is filled with water then by laws of physics all the locations in the basin that have lower elevation than the given location should also be filled with water. Thus, if we have elevation information then we can detect inconsistent class labels that do not adhere to this physical constraint.

Figure 2:
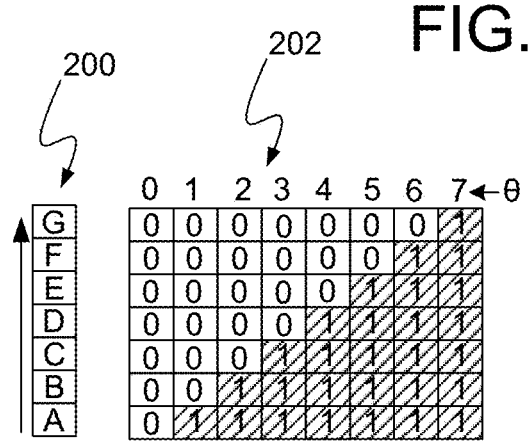
FIG. 2 is an illustrative example showing different physically consistent set of labels for a given elevation ordering.
Figure 3:
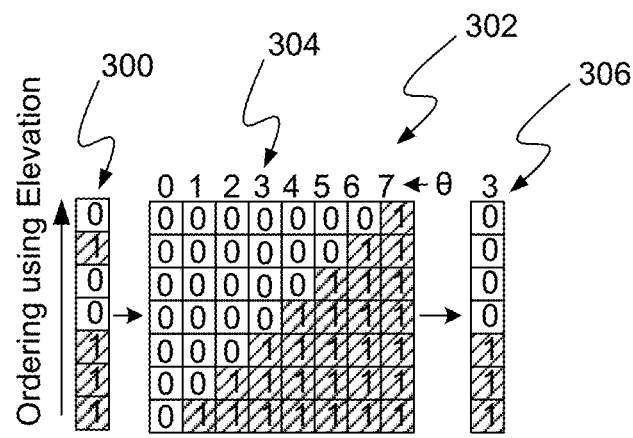
FIG. 3 is an illustrative example showing a physically-consistent label correction process.

Next we describe the mathematical formulation used to improve the accuracy of labels using elevation ordering. Given elevation ordering ($\pi$) and the set of potentially erroneous labels at any given time step t, the aim is to estimate correct labels that are physically consistent with the elevation ordering. For a given elevation ordering of N instances there are only N+1 possible sets of labels that are physically consistent. For example, FIG. 2 shows eight possible sets of physically-consistent labels 202 for an elevation ordering 200 of seven locations. In each set of physically-consistent labels 202, land is represented by the number 0 and no hatching and water is represented by the number 1 and hatching. Each physically-consistent set of labels can be equally represented by the number of water pixels ($\theta$) in the set. For example if we know the number of water pixels in the set to be k, then by definition it will be the deepest k locations. In the absence of any external information about the correct labels, the methodology makes an assumption that majority of the labels are correct and hence selects the set of physically consistent labels that matches the most with input erroneous labels. For example, FIG. 3 shows an erroneous set of input labels 300 and a collection 302 of eight possible sets of physically-consistent labels. Of the eight possible sets of physically-consistent labels, set 304 has the largest number of classifications that match the input labels. As such, a method that selects the physically-consistent labels based only on the closest match will select set 304 as the output set 306. Hence, in this illustrative example, location F is detected as erroneous and its label is changed from water to land.

Next, we describe two embodiments that make use of this elevation-based ordering to further improve the quality of the surface extent maps, which are also referred to as classification maps.

A. Information Transfer Across Time

Figure 4:
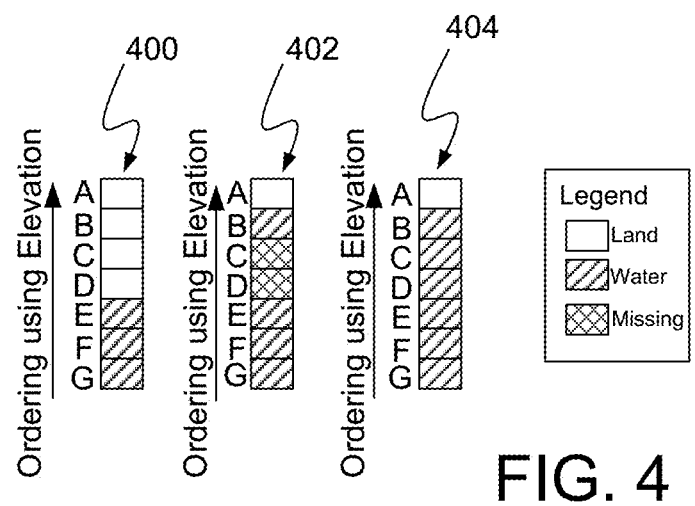
FIG. 4 is an illustrative example showing limitations of physically-consistent label correction when temporal context is not applied.

The elevation based label correction methodology as described above uses estimated relative ordering to correct inconsistencies in each time step independently. Since, MODIS-based classification maps at daily scale can have lots of errors and missing data due to clouds and other atmospheric disturbances, correcting each time step independently is quite challenging and can lead to abrupt changes in surface extents. Consider the illustrative example shown in FIG. 4 where table 400 shows the true labels for locations A-G, table 402 shows the initial classifications given to the locations including "missing" classifications indicated by cross hatching for locations obscured by clouds, and table 404 shows the corrected classifications by identifying the physically-consistent classification that requires the fewest changes to the initial classification. As shown, an algorithm based only on minimizing changes from the initial classification to the physically-consistent classification can identify the wrong water level.

In most situations, a water body grows and shrinks smoothly (except sudden events such as floods) i.e. a lake area is likely to have a very similar extent over the course of two weeks. Hence, we need methods that incorporate the dual objective of correcting mistakes while ensuring temporal consistency in surface extent variations over time.

Figure 5:
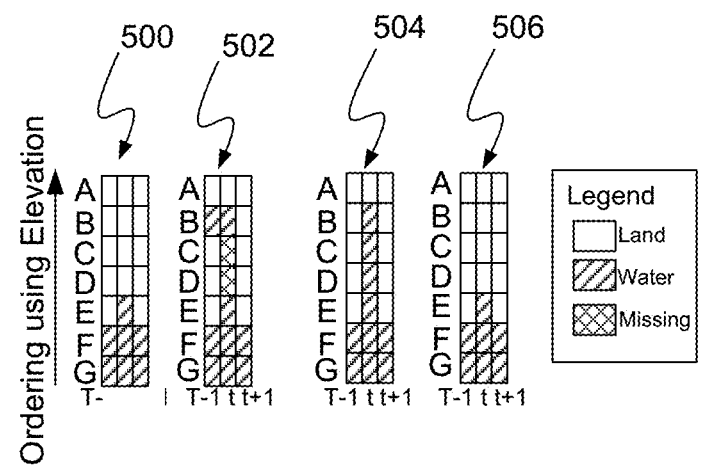
FIG. 5 is an illustrative example showing the utility of incorporating temporal context in an elevation-based label correction process.

FIG. 5 shows the impact of incorporating temporal information in the correction process. In table 500 of FIG. 5, the true labels of locations A-G are provided and in table 502 an initial classification of the locations is provided. In table 504, the results of correcting the initial classification while applying a physically-consistent constraint without applying a temporal constraint is shown, which arrives at the wrong water level. In table 506, the results of correcting the initial classification while applying both a physically-consistent constraint and a temporal constraint is shown, which arrives at the correct water level.

In general, if a water body has N locations then there are N+1 possible water levels for each time step. Further, if the water body has been observed for T time steps, then there are exponential ($N^T$) possible configurations of water levels for the given water body over time. Our goal is to find that configuration of water levels over time that not only show good consistency with input labels (water levels that lead to lower corrections in input labels) but also show good temporal consistency (smoothly changing water levels). Both of these goals conflict with each other. The configuration over time that leads to the best consistency with input labels is obtained when each time step is corrected independently (as explained in the previous section) but would lead to the less temporally consistent water levels. On the other hand, the most temporally-consistent configuration is obtained when all the levels are forced to be constant (no dynamics in surface extents) but would lead to worse consistency with input labels.

Mathematically, given an elevation ordering ($\pi$) and water levels for T time steps ($\theta_{1 \ldots T}$), the consistency with the input labels can be represented as $$\text{Cost}_{mismatch}(T) = \sum_{t=0}^{T} Err(\theta_t, \hat{\pi}) \quad (1)$$

where $Err(\theta, \hat{\pi})$ represents number of inconsistencies detected by choosing water level $\theta_t$ for time step t.

The criteria to measure temporal consistency can be formulated as $$\text{Cost}_{transition}(T) = \sum_{t=0}^{T-1} |(\hat{\theta}_t - \hat{\theta}_{t+1})| \quad (2)$$

The above criterion favors water levels in nearby time steps to be similar and hence enforces temporal consistency.

Overall, we intend to find the configuration of water levels that minimizes both objective functions $$\operatorname*{argmin}_{\hat{\theta}_{1...T}} \text{Cost}_{mismatch}(T) + \alpha \text{Cost}_{transition}(T) \quad (3)$$

where $\alpha$ is a trade-off parameter or weight between the two costs. So, when $\alpha$ is increased, the criterion will favor water levels that are more temporally consistent and when $\alpha$ is decreased, the criterion will favor water levels that better match the initial classification. Hence, as a is increased, $\text{Cost}_{transition}$ decreases and $\text{Cost}_{mismatch}$ increases. The above objective can be optimally solved for any given value of $\alpha$ recursively using dynamic programming. Specifically, the water level at the last time step T is defined as $$\hat{\theta}_T = \operatorname*{argmin}_{k \in [0,N]} \text{Cost}(\hat{\theta}_T = k) \quad (4)$$

where, $\text{Cost}(\hat{\theta}_T = k)$ can be recursively defined as $$\text{Cost}(\hat{\theta}_T = k) = \operatorname*{argmin}_{l \in [0,N]} \text{Cost}(\hat{\theta}_{T-1} = l) + \alpha |k - l| + Err(\theta_T = k, \hat{\pi}) \quad (5)$$

Given the optimum value of $\hat{\theta}_T$ is known, it can be used to determine the optimum value of using the following equation $$\hat{\theta}_{T-1} = \arg \min_{l \in [0,N]} \text{Cost}(\hat{\theta}_{T-1} = l) + \alpha |k - l| + Err(\theta_T = k, \hat{\pi}) \quad (6)$$

Figure 6:
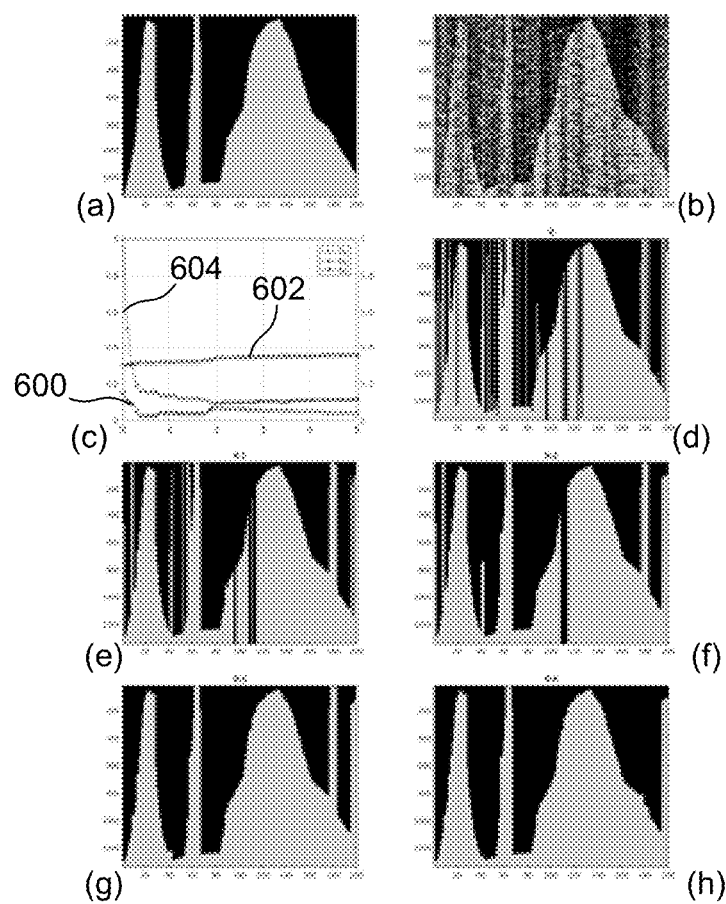
FIG. 6($a$) is a graph of true water levels in an area as a function of time.

FIG. 6 shows the performance of this algorithm on a synthetic dataset for different values of $\alpha$. FIG. 6(a) provides a ground truth of water levels (light colored) with water levels shown on the vertical axis and time shown along the horizontal axis. FIG. 6(b) shows an initial noisy classification of the locations shown in FIG. 6(a), showing a number of errors at each time point. FIG. 6(d) shows a corrected classification map with $\alpha=0$, indicating that only the $\text{Cost}_{mismatch}$ is used. FIGS. 6(e), 6(f), 6(g), and 6(h), show corrected classification maps for progressively larger values of a showing that the accuracy of the classification maps increases with increases in a up to the largest value of $\alpha=0.4$ shown in the figures. FIG. 6(c) shows changes in the total cost 600, the $\text{Cost}_{mismatch}$ 602 and the $\text{Cost}_{transition}$ 604 as a function of $\alpha$, which is shown on the horizontal axis. CAs we can see, as the value of a is increased, the $\text{Cost}_{transition}$ goes down whereas $\text{Cost}_{mismatch}$ increases. Furthermore, initially, $\text{Cost}_{transition}$ decreases at a very fast rate whereas $\text{Cost}_{mismatch}$ increases at a very slow rate which implies that much more temporally consistent water levels can be obtained by very little increase in $\text{Cost}_{mismatch}$. In general, these error curves can be used to determine the suitable value of $\alpha$. Specifically, the value of a should be increased only till there is sufficient reduction in transition cost while not increasing flip cost significantly. As we can see, this method improves the accuracy of the maps than those produced by our previous approach as the error rate goes down from (0.18 for $\alpha=0$ to 0.04 for $\alpha=0.4$).

Thus, rich temporal context provided by the daily temporal resolution of MODIS data can be effectively used to improve the accuracy of the labels at low-resolution.

B. Information Transfer Across Space

The surface extent maps produced using the method above would give accurate maps but at low spatial detail (500 m). The elevation ordering constraint can be used to even improve the resolution of these extent maps. Specifically, if the elevation constraint is available at high-resolution, then it can be used to convert binary labels at low-resolution to binary labels at high-resolution. Assuming the elevation ordering does not change over time, this method does not require the high-resolution information and low-resolution information to be present concurrently and hence can be used in more general scenarios.

Figure 7:
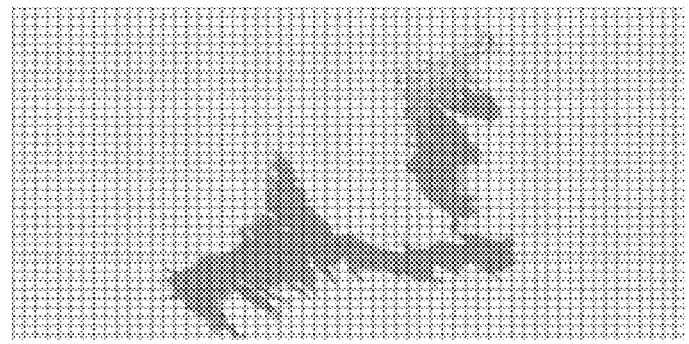
FIG. 7 is relative elevation ordering for KajaKai Reservoir, Afghanistan from SRTM's Digital Elevation data at 30 m spatial resolution with an overlay of corresponding MODIS pixels at 500 m spatial resolution.

FIG. 7 shows elevation structure of KajaKai Reservoir in Afghanistan at 30 m resolution with the low-resolution MODIS grid (500 m) overlaid on top of it. Each grid cell is a low-resolution pixel in the MODIS satellite images and each low-resolution pixel roughly contains 256 high-resolution pixels in the 30 m resolution images.

Initially, we assume that with perfect data and no errors in classification, a cell/pixel at low-resolution will be labelled as water if it has more than a certain number of high-resolution cells/pixels (threshold wth) within it that contain an image of water. In the most general settings, each low-resolution cell can have different thresholds that can also vary with time due to varying spectral properties of the land cover types enclosed within low-resolution cell. Here, we make an assumption that on any given time steps all locations have the same threshold but this threshold can vary over time.

Method 1

Next, we describe a first methodology that uses elevation ordering to transfer information across space. The method has two main steps 1) Step 1. Prepare Dictionary of all possible physically consistent low-resolution extents: Given the high-resolution ordering, a high-resolution classification map can be constructed for each possible water level, where each pixel is classified as either water or land based on the selected water level. In one embodiment, f there are N locations at high-resolution, then there will be N+1 possible water levels (equivalently N+1 high-resolution classification maps). Now, for a single value of pixel count threshold wth, each high-resolution classification map can be converted into its corresponding low-resolution classification map by grouping high-resolution pixels into the corresponding low-resolution pixel, counting the number of high-resolution pixels that contain water, and comparing that number to the pixel count threshold. When the number of high-resolution pixels that contain water exceeds the threshold, the corresponding low-resolution pixel is classified as water. Otherwise, the corresponding low-resolution pixel is classified as land. Note that two different high-resolution classification maps associated with different water levels but the same pixel count threshold can lead to the same low-resolution classification map. This information is stored in a directory where each low-resolution classification map is linked to the water levels that can generate it. This process is repeated for all values of the pixel count threshold wth and a dictionary corresponding to each value of the pixel count threshold is prepared.

2) Step 2. Compare erroneous input low-resolution map with all possible physically consistent maps: Step 1 provides the list of all possible physically-consistent low-resolution classification maps together with water levels that can generate them. In this step, we compare an initial low-resolution classification map that may include one or more physical inconsistencies with all of the physically-consistent low-resolution classification maps across all dictionaries. There can be multiple physically-consistent low-resolution classification maps that can be a best match with the initial low-resolution classification map. To handle this situation, we take the union of all water levels corresponding to these best matches. Finally, using this selected set of water levels we can estimate the high-resolution extents of the bodies of water in the initial low-resolution classification map. The multiple values of water levels in the set implies that there is uncertainty in estimating the correct water level as all the water levels in the set would generate equally consistent low-resolution maps. Hence, we define an uncertainty bound. Specifically, we label all high-resolution locations below the lowest water level in the set (lower bound on water level) as water. Similarly, we label all locations above the highest water level in the set (upper bound on water level) as land. Locations that fall between these bounds are labelled as unknown. The set of high-resolution pixels classified as water that border pixels labeled as unknown or land, define a perimeter of water in the high-resolution classification map. The set of high-resolution pixels classified as land that border pixels labeled as unknown or water, define a perimeter of land in the high-resolution classification map.

Figure 8:
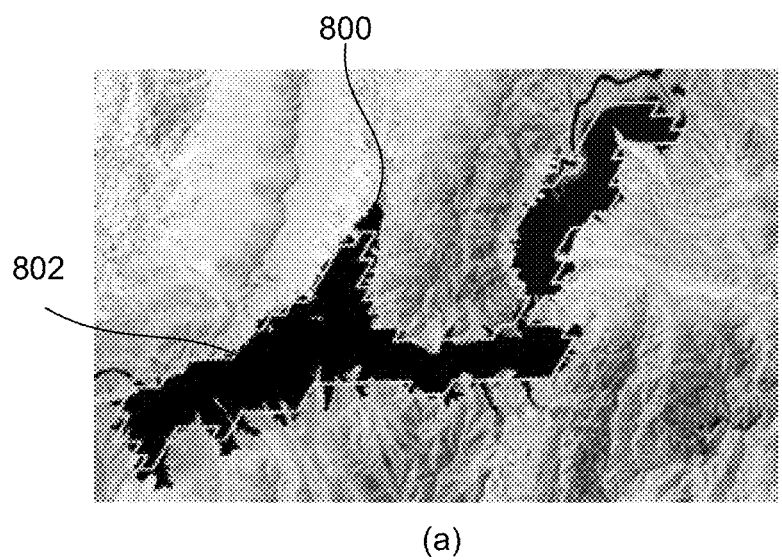
FIG. 8($a$) shows a MODIS scale surface extent map of KajaKai Reservoir, Afghanistan overlaid on a Landsat (30 m resolution) composite image.
Figure 8:
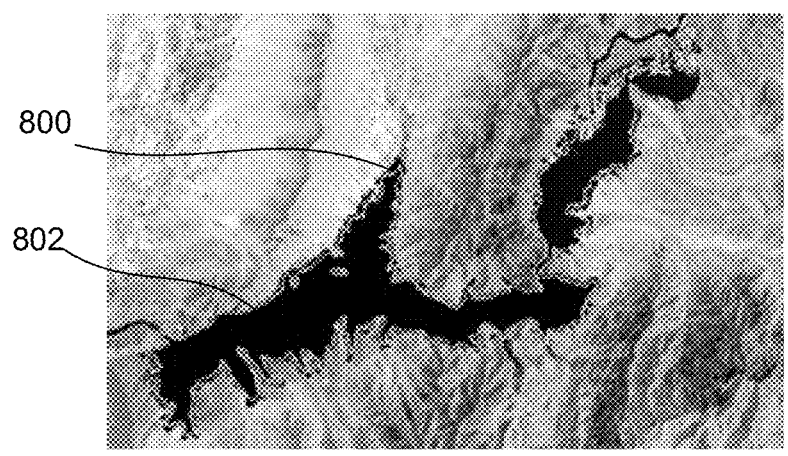

FIG. 8 shows an illustrative example of the information transfer across space process for KajaKai Reservoir on Jul. 5, 2015. In FIG. 8(a), a perimeter 800 of the Reservoir 802 is shown where perimeter 800 was identified using an initial low-resolution classification map. In particular, perimeter 800 is formed of low-resolution pixels classified as water that neighbor a low-resolution pixel classified as land. FIG. 8(b) shows a high-resolution perimeter 804 for Reservoir 802, where the high-resolution perimeter is identified by selecting the lowest water level associated with any of the physically-consistent low-resolution classification maps that best match the initial low-resolution classification map. This lowest water level is then used with the high-resolution elevation ordering of the Reservoir to identify which high-resolution pixels would contain water at that water level. The outermost high-resolution pixels classified as water then form the high-resolution perimeter. Note that high-resolution perimeter 804 is different from low-resolution perimeter 802. In particular, perimeter 804 passes through the center of one or more of the low-resolution pixels in low-resolution perimeter 802.

Ideally, we wish to have the smallest uncertainty gap possible (fewest number of pixels labeled as unknown). The size of the gap depends on various factors such as aggregation threshold (wth), shape and size of the lake, difference between resolutions. In the next section, we provide some bounds on this uncertainty gap under some assumptions which will help in giving insights into the different aspects of the algorithm.

Method 2

The second method for information transfer across space has five main steps: 1) Estimate elevation ordering at high spatial resolution (HSR). 2) Estimate elevation ordering at low spatial resolution (LSR). 3) Estimate accurate and physically-consistent classification maps at LSR. 4) Use elevation ordering at HSR from Step 1 and good quality classification maps at LSR from Step 3 to estimate confident labels at HSR and finally 5) Estimate remaining labels at HSR using elevation constraint. Next, we describe these steps in detail.

Step 1. Estimate Elevation ordering at high spatial resolution ($\hat{\pi}_h$)

In this step, noisy binary classification maps at HSR and low temporal resolution ($H_i$) are used to learn high resolution elevation ordering using an expectation-maximization framework. Note that if a high quality elevation structure is available from any external source it can be used instead of estimating the high resolution elevation structure based on the noisy classification maps.

Step 2. Estimate Elevation ordering at low spatial resolution ($\hat{\pi}_l$)

One way to estimate $\hat{\pi}_l$ would be to use an Expectation-Maximization framework with noisy binary classification maps at LSR and high temporal resolution (Li) similar to Step 1. However, we estimate $\hat{\pi}_l$ using $\hat{\pi}_h$ and $L_i$ as it allows us to 1) estimate the threshold wth together with $\hat{\pi}_l$ and 2) ensure that ordering learned at LSR is coherent with ordering at HSR.

Each LSR pixel contains a number of HSR pixels (gr) where each of the gr pixels have a ranking from $\hat{\pi}_h$. Using $\hat{\pi}_h$, LSR pixels can be ranked in a number of ways. For example, LSR pixels can be ranked based on the lowest rank HSR pixel within each LSR pixel. Similarly, they can be ranked using the highest rank HSR pixel within each LSR pixel. Here, we proposed to generate possible LSR orderings on the basis of assumption A1. Specifically, we define a LSR ordering $\pi_l^{wth}$ as the ordering obtained by using HSR pixels with local rank wth within each LSR pixel. Thus, there can be gr possible LSR orderings that can be generated from $\hat{\pi}_h$.

In the absence of any external information about the correct labels, we select that LSR ordering that leads to the least amount of corrections in $L_1$. This would also automatically provide the estimate of wth that will be used in next steps of the algorithm. Specifically, wth value corresponding to the selected LSR ordering is chosen as the cut-off threshold.

Step 3: Estimate accurate and physically consistent classification maps at LSR ($L_o$)

Once the LSR ordering is estimated in the previous step, we can use it to correct each classification map ($L_i$) individually to obtain physically consistent classification maps at LSR ($L_o$). These corrections can be made using only the mismatch cost between the physically consistent classification maps and the noisy classification maps or by using a combination of the mismatch cost and the transition cost as discussed above. This step improves the quality of the resulting HSR maps because if the information in the LSR maps is of bad quality then it will get propagated in the estimated HSR maps as well.

Step 4. Estimate confident labels in HSR and high temporal resolution ($\hat{H}_o$)

Assuming a LSR pixel can be labelled as water only if it has at least wth HSR water pixels, if we are given a LSR pixel labelled as water, then at least wth HSR pixels within it should be water. By definition, these wth instances will be filled according to their elevation rank (deeper to shallower/lower to higher). Similarly, if a LSR pixel is labelled as land then at least gr-wth HSR pixels within it should be land. Using this knowledge, we can confidently estimate physically consistent labels for some of the HSR pixels within each LSR pixel.

Step 5. Estimate remaining labels in $\hat{H}_o$

After Step 4, there will be a lot of unknown labels in $\hat{H}_o$. For example, if wth is gr/2, then half of the labels in $\hat{H}_o$ would be unknown after Step 4. In this final step, we use $\hat{\pi}_h$ to estimate the labels of remaining instances. Specifically, we first find the shallowest (highest) HSR pixel that is labelled as water (Pivot$_w$) and label all the instances deeper (lower) than it as water as well due to the physical constraint. Using the same rationale, we find the deepest (lowest) HSR pixel labelled as land (Pivot$_l$) and label all instances shallower than it as land as well. This step significantly reduces the number of unknown labels.

Finally, instances that are between pivots Pivot$_w$ and Pivot$_l$ remain unlabeled. Note that the elevation of Pivot$_l$ will always be higher that the elevation of Pivot$_w$ because Step 4 ensures that only physically consistent labels are estimated. Ideally, the gap between Pivot$_l$ and Pivot$_w$ should be as small as possible.

Analysis of Information Transfer Across Space

A. Claim

Given an elevation ordering at high-resolution (which is independent of the mapping grid) and perfect binary labels at low-resolution (created using a given threshold, wth), the estimated high extent map using our method will have unknowns only at the perimeter of the true extent with the probability $$1 - \left[\left(\frac{M-1}{M+1}\right)|P_L^i| + \left(\frac{M}{M+1}\right)|P_L^i| - \left(\frac{M-2}{M+1}\right)|P_L^i|\right]$$

B. Definitions

Perimeter: Perimeter of a given surface extent map is defined as the union of the pixels in the neighborhood of the water pixels at the boundary of the extent. $P_L^i$ represents set of pixels at low-resolution that are the perimeter of the low-resolution extent i. Similarly, $P_H^i$ represents set of pixels at high-resolution that are the perimeter of the high-resolution extent i.

M: M is the number of high-resolution pixels in a low-resolution pixel.

Transition Pixel: A high-resolution pixel within each low-resolution pixel corresponding to level wth.

Global Water Pivot: deepest water level in the selected set of water level in the Step 2 of the algorithm.

Global Land Pivot: shallowest water level in the selected set of water level in the Step 2 of the algorithm.

So, given these definitions, the claims suggests that the extents with larger perimeter at low-resolution will have high probability of restricting the errors on the perimeter. Similarly, as the ratio of the two grids gets smaller (M gets smaller), the probability will increase.

C. Proof

Key Observations

1) If a pixel's label is known to be water then all the pixels deeper than the given pixel should also be water due to the physical constraint of elevation ordering. Similarly, if a pixel's label is known to be land then all the pixels shallower than the given pixel should also be land.

2) Elevation structure follows the proximity assumption i.e. for a given perimeter $P_H^i$, all the pixels enclosed by it are strictly deeper than pixels in the perimeter. Similarly, pixels that are not enclosed by the perimeter will be strictly shallower than pixels in the perimeter. In other words, a water body grows in layers (contours)

3) Furthermore, due to this assumption, a pixel at high-resolution will always have at least one neighbor that is shallower and at least one neighbor that is deeper than the given pixel.

4) By definition, for a given true high-resolution extent $E_H^i$, the shallowest high-resolution water pixel within a low-resolution pixel will always be on the boundary of the $E_H^i$ (i.e. in the perimeter set $P_H^i$)

5) The shallowest water pixel within a low-resolution pixel get assigned a label by Step 2 of the algorithm only if that pixel is the transition pixel of that low-resolution pixel. If the shallowest pixel is deeper than the transition pixel, then it implies that the water level is less than wth and hence no pixel will be labelled as water. On the other hand, if the shallowest water pixel is shallower than the transition pixel then only the transition pixel and pixels below it are labelled as water.

So, given these observations, if Step 2 of the algorithm (assigning labels to confident pixels using the aggregation threshold wth) is able to assign water label to any of the pixels in $P_H^i$ (i.e. the pivot water pixel is in the perimeter set, $P_H^i$), then due to observation 2, this would mean that all the pixels enclosed by the perimeter will be labelled as water. Similarly, if Step 2 of the algorithm is able to assign land label to any of the pixels in the perimeter, then all the pixels that are outside of the perimeter will get labelled as land. Hence, in worst case, the unknown labels will be only at the perimeter.

In general, if the above conditions hold, the number of unknowns can even be less than the number of perimeter pixels. If there are some pixels in the perimeter set that are deeper than the pivot water pixel in the perimeter set, then they will get assigned a label as well. Similarly, for land. Thus, the claim provides the lower bound on the number of the unknown labels under aforementioned conditions.

Now, we derive the probability that the pivot water pixel and pivot land pixel are within the perimeter set.

A perimeter pixel at high-resolution will be assigned a water label only if one of the following two conditions hold true C1. There exists a modis pixel that is filled till level wth Due to observation 4, water pixels at the boundary of the true extent are always the shallowest pixels within each low-resolution pixel. Due to observation 5, the shallowest water pixel within a low-resolution pixel is assigned a label only when Condition 1 holds. Since, for the shallowest one of the water pixel at the boundary of true water extent at high-resolution will always be the shallowest pixel within the modis pixel, it will be assigned a label due to observation 4.

C2. There exists a modis pixel that is filled till level wth+1

In this case, the water pixel at the boundary of the true extent at high-resolution will not be assigned water label due to observation 5, but due to observation 3, there will always be a pixel in its neighborhood that will be equal to the transition pixel or a deeper than the transition pixel and hence will get labelled as water.

A perimeter pixel will be assigned a land label in the following condition

C3. There exists a low-resolution pixel that is filled till level wth−1

In this case, due to observation 5, the shallowest water pixel will not be labelled, but pixels shallower than it in its neighborhood will be labelled as land due to observation 3.

To summarize, there should be at least one low-resolution pixel that should satisfy either Condition 1 or Condition 2 and there should be at least one low-resolution pixel that satisfy Condition 3. In terms of probability $$1 - [P(!C1 \& !C2) + P(!C3) - P(!C1 \& !C2 \& !C3)] \quad (7)$$

Since, we make an assumption that the elevation structure is independent of the mapping grid, any given true extent at high-resolution $E_H^i$ can induce all possible water levels in the boundary pixels at low-resolution ($P_L^i$). In other words, the above assumption implies that the probability of a low-resolution pixel to be any water level is $1/(M+1)$. Now, for a low-resolution pixel not be able to assign water label to water pixel in the perimeter set $P_H^i$, it should be water levels other than wth and wth+1 which has the probability $(M+1-2/M+1)$. Now, For all low-resolution pixels in the low-resolution parameter set ($P_L^i$) to not be in levels wth or wth+1 is $$P(!C1 \& !C2) = \left(\frac{M-1}{M+1}\right)^{|P_L^i|} \quad (8)$$

Similarly, for all low-resolution pixels in $P_L^i$ to not be at level wth−1, the probability is $$P(!C3) = \left(\frac{M}{M+1}\right)^{|P_L^i|} \quad (9)$$

Using the above equations, the probability that both global water pivot and global land pivot will be in the perimeter set $P_H^i$ is $$1 - \left[\left(\frac{M-1}{M+1}\right)^{|P_L^i|} + \left(\frac{M}{M+1}\right)^{|P_L^i|} - \left(\frac{M-2}{M+1}\right)^{|P_L^i|}\right] \quad (10)$$

As we can see, the probability depends on number of pixels perimeter set at low-resolution. For example,
for M=100, $|P_L^i|$=350, the probability is 0.96
for M=225, $|P_L^i|$=700, the probability is 0.95
for M=400, $|P_L^i|$=1500, the probability is 0.97

Figure 9:
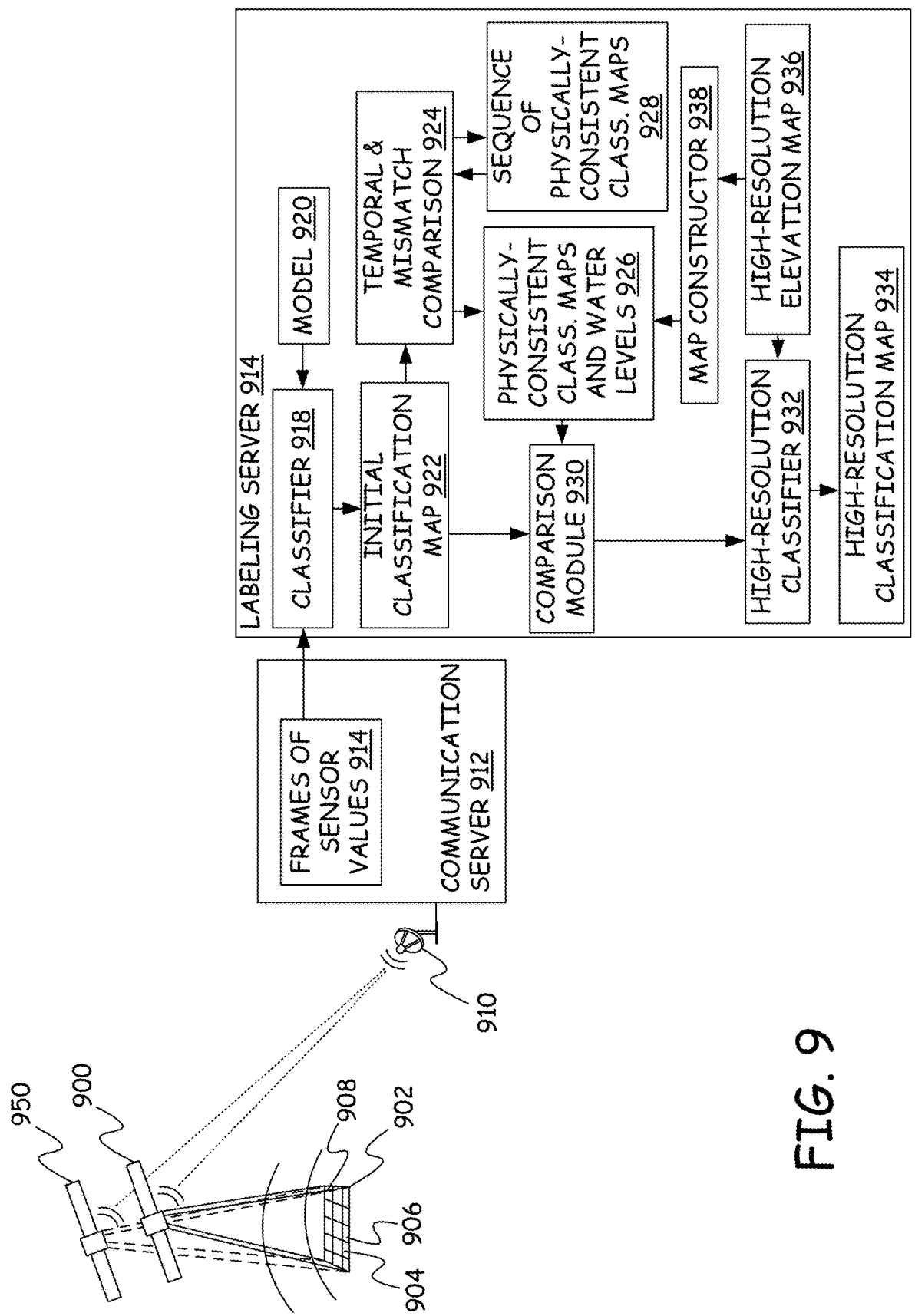
FIG. 9 is a diagram of a satellite image classification system used in the various embodiments.

FIG. 9 provides a system diagram of a system used to improve the efficiency and accuracy of computer-based labeling technology that automatically labels satellite data to determine the extent of bodies of water. In FIG. 9, a satellite 900, positioned in orbit above the earth and having one or more sensors, senses values for a geographic location 902 that is comprised of a plurality of geographic areas/smaller geographic locations 904, 906 and 908. Multiple sensors may be present in satellite 900 such that multiple sensor values are generated for each geographic area of geographic location 902. In addition, satellite 900 collects frames of sensor values for geographic location 902 with each frame being associated with a different point in time. Thus, at each point in time, one or more sensor values are determined for each geographic area/smaller geographic location in geographic location 902 creating a time series of sensor values for each geographic area/smaller geographic location. Each frame of sensor values is alternatively referred to as an image of geographic location 902 with each sensor value representing a pixel in that image. This is true even when the sensor values represent visually imperceptible phenomena such as infrared or ultraviolet electro-magnetic radiation.

A second satellite 950 positioned in orbit above the earth and having one or more sensors, senses values for geographic location 902 at a lower resolution than satellite 900 such that two or more of the geographic areas in geographic location 902 are represented by a single sensor value. Satellite 950 collects frames of sensor values for geographic location 902 with each frame being associated with a different point in time. Each frame is alternatively referred to as an image of geographic location 902 with each sensor value representing a pixel in that image. This is true even when the sensor values represent visually imperceptible phenomena such as infrared or ultraviolet electro-magnetic radiation. Note that because the images produced by second satellite 950 are a lower resolution, each pixel in the images created by second satellite 950 represents a larger surface on earth than the pixels in the images generated by satellite 900.

Satellites 900 and 950 transmit the sensor values to a receiving dish 910 or respective receiving dishes, which provide the sensor values to a communication server 912. Communication server 912 stores the sensor values as frames of sensor values (images) 914 in a memory in communication server 912. A labeling server 916 receives frames of sensor values 914 and provides the received frames of sensor values to a classifier 918, which uses a model 920 to classify each sensor value/pixel in each frame into one of a set of classes such as Land, Water or Unknown, thereby forming an initial classification map 922.

In accordance with one embodiment, initial classification map 922 is improved by applying initial classification map 922 to a temporal and mismatch comparison module 924, which determines a temporal cost and a mismatch cost for each of a set of physically-consistent classifier maps 926 for each frame. The temporal cost for a frame is computed based on the difference between the water level associated with the physically-consistent classification map and a water level of a physically-consistent classification map that was selected for a temporally neighboring frame. The mismatch cost is computed based on the differences between initial classification map 922 and the physically-consistent classifier map. In one particular embodiment, the mismatch cost is based on the number of pixels in initial classification map 922 that must have their initial classification changed if the classification map is to be consistent with the water level associated with the physically-consistent classifier map. In accordance with one embodiment, a recursion is performed across a series of frames to identify the sequence of physically-consistent classification maps and associated water levels 928 that provide the lowest combined temporal cost and mismatch cost as discussed above.

In accordance with a further embodiment, each initial classification map 922 that is low-resolution is used to identify a high-resolution classification map 934. In particular, a comparison module 930, identifies one or more physically-consistent low-resolution classification maps 926 that are the lowest-cost physically-consistent classification maps given the initial classification map 922. In accordance with one embodiment, the lowest-cost physically-consistent classification maps are those maps that can be produced from initial classification map 922 with the fewest changes to initial classification map 922. In other words, the lowest-cost physically-consistent maps are those maps with the most classifications in common with and fewest differences with initial classification map 922.

In accordance with one embodiment, physically-consistent low-resolution classification maps 926 are constructed by a map constructor 938 applying different water levels to a high-resolution depth/elevation map 936 of the geographic area and setting classifications for the low-resolution pixels based on which of the high-resolution pixels would contain water at that water level. Specifically, for each water level, map constructor 938 identifies and counts the high-resolution pixels in each low-resolution pixel that would contain water at that water level. The number of high-resolution pixels that would contain water is then compared to a threshold count to determine if the low-resolution pixel should be classified as water or land for the water level. In particular, if more than the threshold count of high-resolution pixels would contain water, the low-resolution pixel is classified as water and if not, the low-resolution pixel is classified as land.

Note that a single physically-consistent low-resolution map can be associated with multiple different water levels for the same threshold count. In other words, even though different numbers of high-resolution pixels contain water at different water levels, the same low-resolution classification map is constructed. In accordance with one embodiment, map constructor 938 stores an association between each physically-consistent low-resolution map and all of the water levels that can produce the physically-consistent low-resolution map for a particular threshold count. In some embodiments, a separate dictionary of physically-consistent low-resolution maps is produced for each threshold count, where each dictionary provides a separate association between physically-consistent low-resolution classification maps and water levels.

When performing the comparison between initial classification map 922 and physically-consistent low-resolution classification maps 926, it is possible for comparison module 930 to identify multiple physically-consistent low-resolution maps that are equally close to initial classification map. This possibility, combined with the possibility of any one physically-consistent low-resolution classification map being associated with multiple water levels, means that there is a set of equally-probable water levels that could have produced the frame of sensor values captured by the low-resolution satellite. To address this, a high-resolution classifier 932 forms a union of all water-levels associated with all physically-consistent low-resolution classification maps considered to be closest to initial classification map 922 by comparison module 930. High-resolution classifier 932 then selects the lowest water level and the highest water level in that union and applies the lowest water level to the high-resolution elevation/depth map 936 to identify high-resolution pixels that would be covered by water at the lowest water level. The outermost high-resolution pixels covered by water (the high-resolution pixels covered by water that neighbor high-resolution pixels that would not be covered by water) are then designated as the perimeter of the water. In some embodiments, high-resolution classifier 932 also applies the highest water level to the high-resolution elevation/depth map 936 to identify high-resolution pixels that neighbor and are above pixels that would be covered with water at the highest water level. These pixels are then designated as a perimeter for land in the high-resolution classification map 934.

Figure 10:
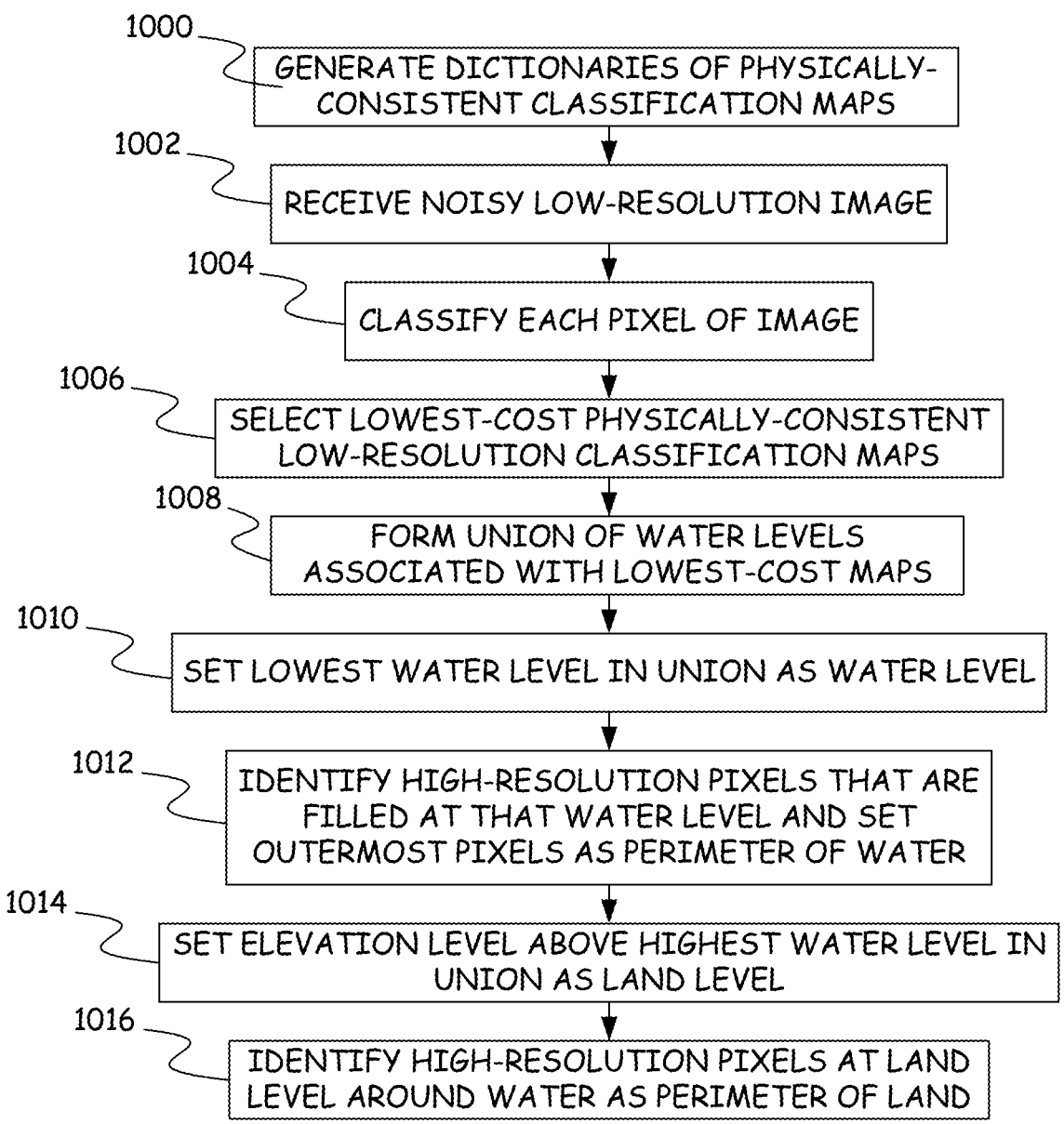
FIG. 10 provides a flow diagram for generating high-resolution classification maps from low-resolution images.
Figure 11:
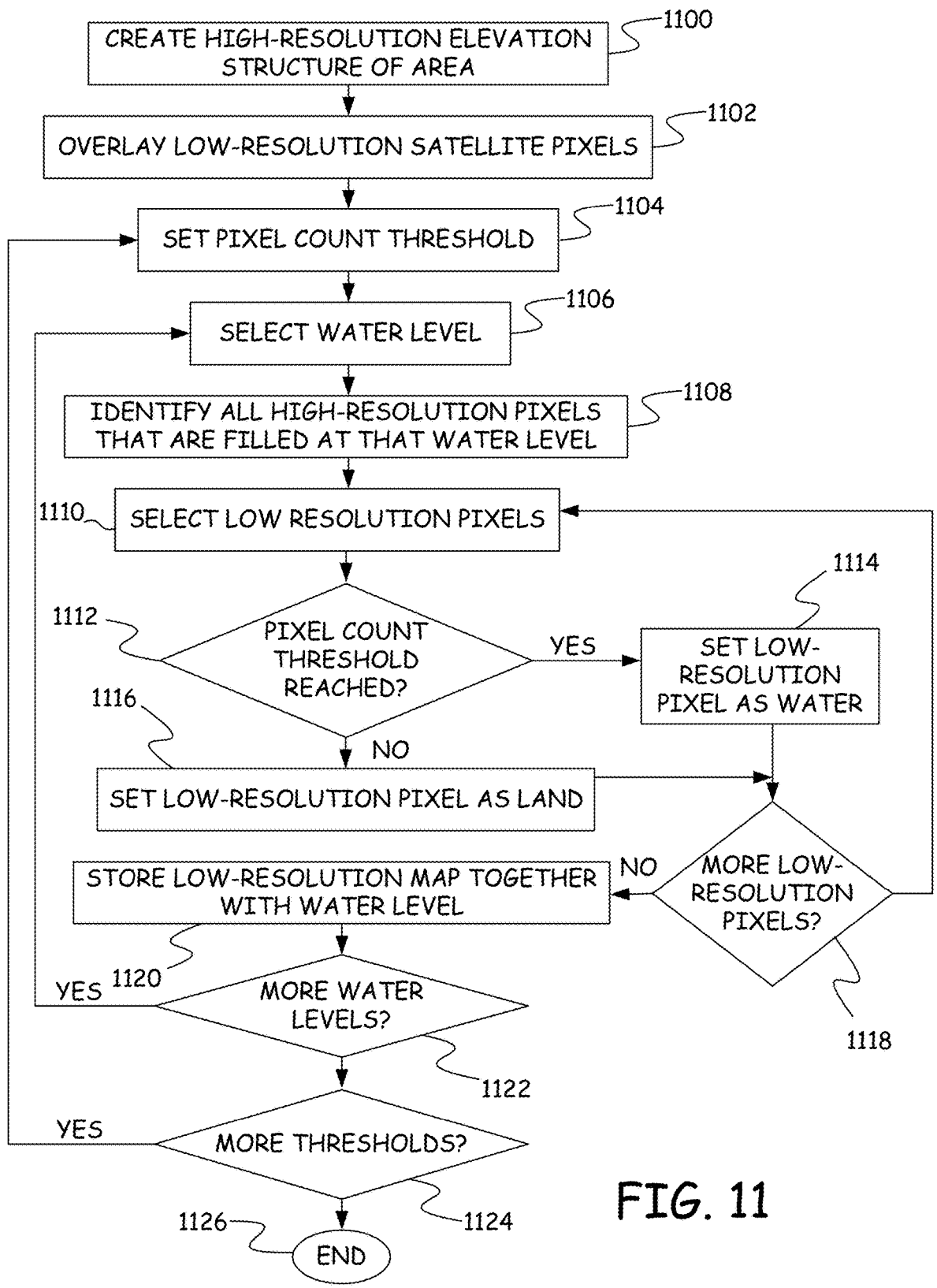
FIG. 11 provides a flow diagram for generating dictionaries of physically-consistent low-resolution classification maps with associated water levels.

FIG. 10 provides a flow diagram for generating high-resolution classification maps 934 in accordance with one embodiment. In step 1000, dictionaries of low-resolution extents, such as physically-consistent classification maps 926 are generated. FIG. 11 provides a flow diagram of a method for generating such dictionaries.

At step 1100, the high-resolution elevation map 926 is constructed for the geographic area. This high-resolution elevation map provides an elevation structure of the geographic area that indicates the relative height of each high-resolution pixel. In a worst case, each high-resolution pixel is at a separate height. In most circumstances, collections of high-resolution pixels are at the same height. At step 1102, low-resolution satellite pixels are overlaid on the high-resolution elevation map. In other words, each high-resolution pixel is assigned to one of the low-resolution pixels for a frame of sensor values 914.

At step 1104, a pixel count threshold is selected. In accordance with one embodiment, the pixel count threshold is selected from a set of possible pixel count thresholds spanning from one to the total number of high-resolution pixels in a complete low-resolution satellite image.

At step 1106, a water level is selected from a set of possible water levels. In step 1108, all high-resolution pixels in the low-resolution image that are filled at that water level are identified. At step 1110, a low-resolution pixel is selected and at step 1112, the high-resolution pixels assigned to that low-resolution pixel are examined to determine how many of the high-resolution pixels are filled at that water level. That number is then compared to the pixel count threshold. If the number of high-resolution pixels filled with water exceeds the pixel count threshold, the low-resolution pixel is classified as water in step 1114. If the threshold is not exceeded at step 1112, the low-resolution pixel is classified as land at step 1116. If there are more low-resolution pixels to process at step 1118, the process returns to step 1110 to select a different low-resolution pixel. If there are no more low-resolution pixels at step 1118, the process continues at step 1120 where the low-resolution map is stored as a physically-consistent classification map 926 together with the water level. In accordance with one embodiment, before storing the low-resolution map, existing physically-consistent classification maps 926 are compared to the low-resolution map. In an existing physically-consistent classification map 926 is the same as the current low-resolution map, the water level for the current low-resolution map is simply added to the list of water levels associated with the physically-consistent classification map 926. In accordance with one embodiment, the physically-consistent low-resolution classification maps 926 are grouped together in dictionaries with a separate dictionary for each selected pixel count threshold.

At step 1122, the process determines if there are more water levels, if there are more water levels, the process returns to step 1106 to select a new water level and steps 1108-1122 are repeated. When there are no more water levels at step 1122, the process determines if there are more pixel count thresholds at step 1124. If there are more pixel count thresholds, the process returns to step 1104 and steps 1106-1124 are repeated. When there are no more thresholds, the process for generating the dictionaries of physically-consistent low-resolution maps ends at step 1126.

Returning to FIG. 10, after generating the dictionaries of physically-consistent low-resolution classification maps, the process of FIG. 10 continues at step 1002 where it receives a low-resolution image or frame of sensor values 914. At step 1004, classifier 918 classifies each low-resolution pixel of the frame of sensor values to produce an initial classification map 922. At step 1006, comparison module 930 selects the lowest-cost physically-consistent low-resolution classification maps given the initial classification map 922. In accordance with one embodiment, the lowest-cost physically-consistent low resolution classification maps are the maps that require the fewest changes to initial classification map 922 in order to form the physically-consistent low resolution classification map. High-resolution classifier 932 then forms a union of the water levels associated with the lowest-cost low-resolution classification maps at step 1008. At step 1010, high-resolution classifier 932 sets the lowest water level in the union as the water and at step 1012 identifies high-resolution pixels that are filled at that water level. The outermost such pixels are set as the perimeter of the water where an outermost pixel is a pixel that neighbors at least one pixel that is not covered by water at that water level. At step 1014, high-resolution classifier 932 sets the elevation level above the highest water level in the union of water levels as a land level. At step 1016, the high-resolution classifier 932 identifies all high-resolution pixels at the land level that surround the identified perimeter of water as a perimeter of land.

Figure 12:
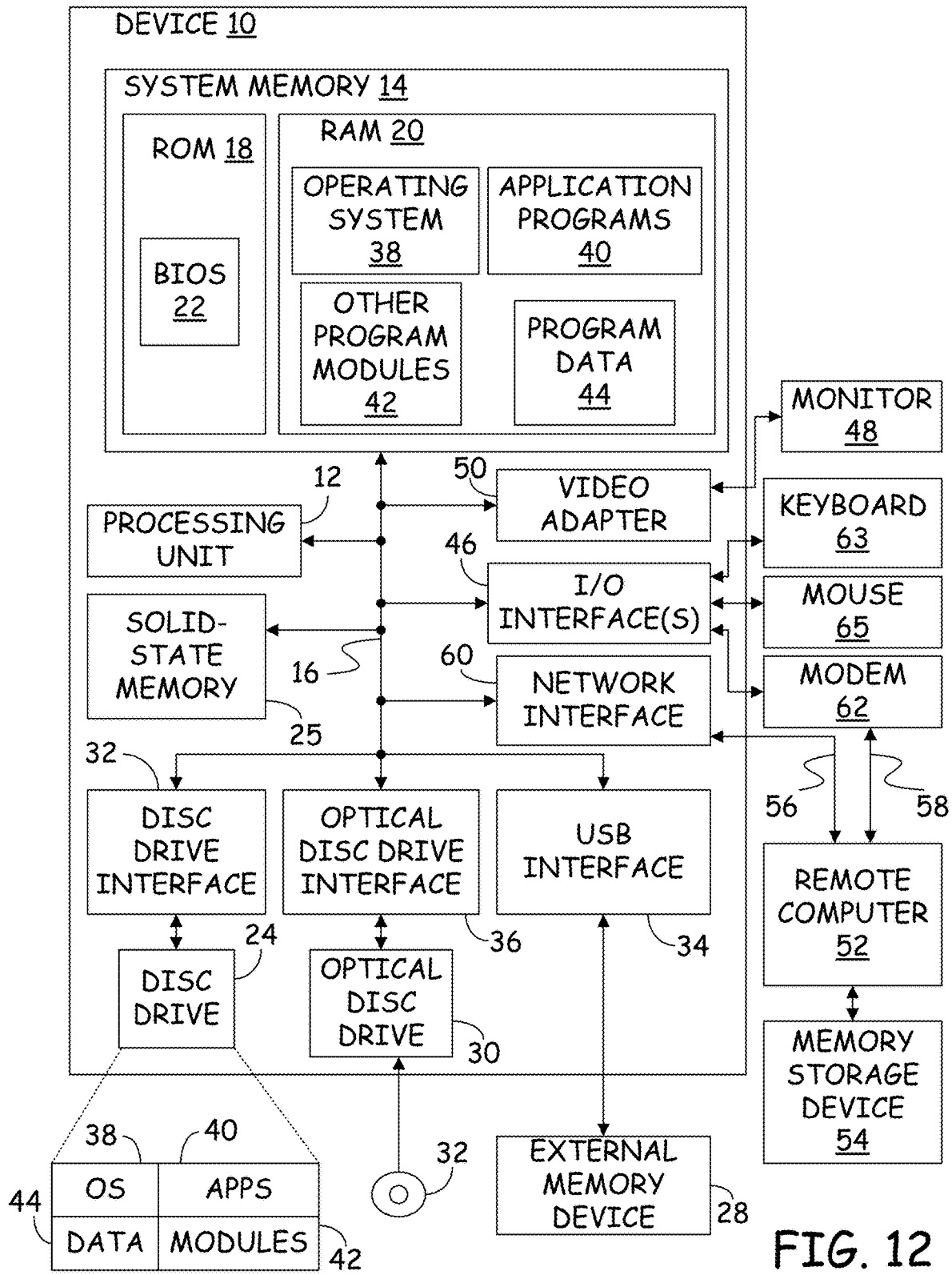
FIG. 12 is a block diagram of a computing device used in the various embodiments.

An example of a computing device 10 that can be used as a server and/or client device in the various embodiments is shown in the block diagram of FIG. 12. For example, computing device 10 may be used to perform any of the steps described above. Computing device 10 of FIG. 12 includes a processing unit (processor) 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, a solid state memory 25, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid state memory and external memory devices and their associated computer-readable media provide nonvolatile storage media for computing device 10 on which computer-executable instructions and computer-readable data structures may be stored. Other types of media that are readable by a computer may also be used in the exemplary operation environment.

A number of program modules may be stored in the drives, solid state memory 25 and RAM 20, including an operating system 38, one or more application programs 40, other program modules 42 and program data 44. For example, application programs 40 can include instructions for performing any of the steps described above. Program data can include any data used in the steps described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

Computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 12. The network connections depicted in FIG. 12 include a local area network (LAN) 56 and a wide area network (WAN) 58. Such network environments are commonplace in the art.

Computing device 10 is connected to the LAN 56 through a network interface 60. Computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 12 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above.

What is claimed is:
1. A method comprising:
classifying low-resolution pixels of a low-resolution satellite image of a geographic area to form an initial classification map;

selecting at least one physically-consistent classification map of the low-resolution pixels based on the initial classification map; and using a water level associated with at least one of the physically-consistent classification maps and an elevation map that provides an elevation for each high-resolution pixel to identify a set of high-resolution pixels as representing a perimeter of water in the geographic area.

2. The method of claim 1 wherein each of the physically-consistent classification maps of the low-resolution pixels provides a set of low-resolution pixels representing a perimeter of the water in the geographic area that is different from the perimeter of the water represented by the high-resolution pixels.

3. The method of claim 2 wherein the perimeter of the water represented by the high-resolution pixels passes within a low-resolution pixel.

4. The method of claim 1 wherein using the water level associated with at least one of the physically-consistent classification maps comprises using a lowest water level associated with any of the selected physically-consistent classification maps.

5. The method of claim 1 wherein each selected physically-consistent classification map is associated with a respective threshold number of high-resolution pixels such that a low-resolution pixel in the physically-consistent classification map is designated as land unless a water level associated with physically-consistent classification map will cause more than the threshold number of high-resolution pixels in the low-resolution pixel to contain water.

6. The method of claim 5 wherein the at least one selected physically-consistent classification maps comprise at least two physically-consistent classification maps with different associated threshold numbers of high-resolution pixels.

7. The method of claim 1 further comprising:
using a second water level associated with at least one of the selected physically-consistent classification maps to identify a set of high-resolution pixels as representing a perimeter of land in the geographic area.

8. The method of claim 1 wherein selecting at least one physically-consistent classification map of the low-resolution pixels based on the initial classification map comprises selecting a physically-consistent classification map based on a number of differences between the physically-consistent classification map and the initial classification map.

9. The method of claim 8 wherein a plurality of physically-consistent classification maps of the low-resolution pixels have the same number of differences when compared to the initial classification map.

10. A system comprising:
a memory having computer instructions; and
a processor executing the computer instructions to implement:
a classifier receiving a low-resolution image of a geographic area and classifying each pixel of the image to form an initial classification map;
a comparison module comparing the initial classification map to a plurality of physically-consistent classification maps to select a physically-consistent classification map; and a high-resolution classifier classifying high-resolution pixels of the geographic area based on the selected physically-consistent classifier map and based on an elevation map that provides an elevation for each high-resolution pixel.

11. The system of claim 10 wherein the high-resolution classifier classifies the high-resolution pixels by selecting a water level associated with the physically-consistent classification map and determining which high-resolution pixels would contain water at that water level.

12. The system of claim 10 wherein the comparison module selects a plurality of physically-consistent classification maps and the high-resolution classifier classifies the high-resolution pixels based on the plurality of selected physically-consistent classifier maps.

13. The system of claim 12 wherein at least one of the physically-consistent classification maps is associated with multiple water levels.

14. The system of claim 13 wherein the high-resolution classifier classifies the high-resolution pixels by identifying a lowest water level associated with any of the selected physically-consistent classifier maps and determining which high-resolution pixels would contain water at that lowest water level.

15. The system of claim 14 wherein the high-resolution classifier classifies the high-resolution pixels by identifying a highest water level associated with any of the selected physically-consistent classifier maps and determines which high-resolution pixels would not contain water at that highest water level.

16. A method comprising:
receiving a low-resolution image of a geographic area and classifying each pixel of the image to form an initial classification map;
comparing the initial classification map to a plurality of physically-consistent classification maps to select a physically-consistent classification map; and
classifying high-resolution pixels of the geographic area based on the selected physically-consistent classifier map and based on a high-resolution elevation map that provides an elevation for each high-resolution pixel.

17. The method of claim 16 wherein classifying the high-resolution pixels comprises classifying the high resolution pixels by selecting a water level associated with the physically-consistent classification map and determining which high-resolution pixels would contain water at that water level.

18. The system of claim 16 wherein at least one of the plurality of physically-consistent classification maps is associated with multiple water levels.

19. The system of claim 18 wherein classifying the high-resolution high-resolution pixels comprises identifying a lowest water level associated with any of the selected physically-consistent classifier maps and determining which high-resolution pixels would contain water at that lowest water level.

20. The system of claim 19 wherein classifying the high-resolution pixels comprises identifying a highest water level associated with any of the selected physically-consistent classifier maps and determining which high-resolution pixels would not contain water at that highest water level.

* * * * *